United States Patent [19]

Kamata et al.

[11] Patent Number: 4,696,973

[45] Date of Patent: * Sep. 29, 1987

[54] IMPACT MODIFIER AND THERMOPLASTIC RESIN COMPOSITION USING THE SAME

[75] Inventors: Kazumasa Kamata, Koganei; Kazuo Ueda; Kiyokazu Kitai, both of Ohtake, all of Japan

[73] Assignee: Mitsubishi Rayon Co., Ltd., Tokyo, Japan

[ * ] Notice: The portion of the term of this patent subsequent to Jan. 14, 2003 has been disclaimed.

[21] Appl. No.: 641,989

[22] Filed: Aug. 20, 1984

[30] Foreign Application Priority Data

Aug. 25, 1983 [JP] Japan ................................. 58-155325
Aug. 25, 1983 [JP] Japan ................................. 58-155326

[51] Int. Cl.[4] ...................... C08L 51/04; C08L 53/04
[52] U.S. Cl. ...................................... 525/71; 525/78; 525/80; 525/81; 525/84; 525/85
[58] Field of Search ....................... 525/78, 80, 81, 85, 525/84, 71

[56] References Cited

U.S. PATENT DOCUMENTS 4,220,734 9/1980 Kosugi et al. .................... 525/85
4,564,653 1/1986 Kamata et al. .................... 525/78

*Primary Examiner*—Jacob Ziegler
*Attorney, Agent, or Firm*—Cushman, Darby & Cushman

[57] ABSTRACT

Am impact modifier comprising a blend of 100 parts by weight of a graft copolymer (A) obtained by graft-polymerizing in a single or more stages a monomer or monomer mixture consisting of 95 to 100% by weight of at least one monomer selected from the group consisting of alkyl acrylates, alkyl methacrylates, aromatic vinyl compounds and vinyl cyanide compounds and 0 to 5% by weight of a polyfunctional crosslinking agent on an acrylic elastomer mainly composed of an alkyl acrylate and containing 0.1 to 5% by weight of a polyfunctional crosslinking agent and/or a butadiene elastomer composed of a polybutadiene or a copolymer of 50% by weight or more of a butadiene and 50% by weight or less of other vinyl compound copolymerizable therewith and containing 0 to 5% by weight of a polyfunctional crosslinking agent, and 0.1 to 20 parts by weight of a copolymer (B) obtained by copolymerizing 3 to 30% by weight of an unsaturated acid monomer and 97 to 70% by weight of a vinyl monomer copolymerizable therewith, and a thermoplastic resin composition having high impact resistance and excellent moldability and workability comprising 3 to 50 parts by weight of the modifier set forth above and 100 parts of weight of a thermoplastic resin.

4 Claims, No Drawings

IMPACT MODIFIER AND THERMOPLASTIC RESIN COMPOSITION USING THE SAME

OBJECT OF THE INVENTION

1. Field of Industrial Application

This invention relates to an impact modifier capable of affording to resins high impact resistance as well as excellent moldability and workability, and thermoplastic resin compositions containing such modifier and provided with high impact resistance and excellent moldability and workability.

2. Description of Prior Art

Thermoplastic resins, especially vinyl chloride resins (hereinafter referred to as PVC), although widely used as a general-purpose resin, are not entirely satisfactory in mechanical properties, PVC is generally poor in impact strength, especially in notched impact strength, and a variety of methods have been proposed for improving such impact strength of PVC.

Among these proposals, the most effective method is to mix in PVC a graft copolymer obtained by graft-polymerizing a monomer such as styrene, methyl methacrylate, acrylonitrile or the like on a conjugated diene elastomer. Such graft copolymers are already commercially available as an impact modifier of PVC and contribute greatly to the expansion of the range of use of PVC molded products.

On the other hand, these graft copolymers are poor in weather resistance and unsuited for outdoor uses since the elastomer used in such copolymers contains many double bonds in the main chain. As a solution to this problem, it has been proposed to use a saturated polyalkylacrylate as the elastomer and to blend with PVC a copolymer obtained by graft-polymerizing an alkyl methacrylate, aromatic vinyl compound, vinyl cyanide compound or the like on said elastomer to thereby provide a resin composition with improved weather resistance.

Problems to be Solved by the Invention

In the preparation of profile shapes, there are cases where the shapes must be formed under the conditions where milling of the material is impossible because of extremely high lubricity, and in such cases a composition having high impact strength is required. However, none of the impact modifiers proposed hitherto is incapable of providing a satisfactory improvement of impact strength. For example, in the case of graft copolymer prepared by graft-polymerizing a resin material having good compatibility with PVC on an elastomer, which is known as a typical example of a conventional impact modifier, this graft copolymer is uniformly dispersed in PVC and exhibits a satisfactory impact resistance when it is worked at high temperature or when the amount of the lubricant is relatively small, but said graft copolymer is coagulated in PVC and fails to show any significant impact resistance when it is worked at low temperature or when a large amount of lubricant is used.

CONSTRUCTION OF THE INVENTION

Means for Solving the Problems

The present inventors have noted that uniform dispersion of such graft copolymer in PVC contributes greatly to the development of impact strength, and as a result of further studies, it was found that an improved impact modifier can be obtained by blending in specific ratios a graft copolymer prepared by graft-polymerizing an alkyl acrylate, alkyl methacrylate, aromatic vinyl compound, vinyl cyanide compound or the like on an acrylic elastomer mainly composed of alkyl acrylate and/or an elastomer mainly composed of butadiene and a specific copolymer using an unsaturated acid monomer as an essential constituent. As it was found, PVC resin is blended with this impact modifier, even under the condition where milling is difficult and shearing stress is little at the time of working, its gelation is amazingly promoted and also its melting is promoted to render the graft copolymer into a well dispersed state to help to develop impact strength. Further, said impact modifier is capable of affording even higher impact strength under the conditions where milling is easy to perform, thus allowing development of high impact strength under diversified molding conditions. In addition, said impact modifier is also capable of improving workability and surface gloss of the product. The present invention was achieved on the basis of said finding.

Thus, the present invention provides an impact modifier comprising a blend of 100 parts by weight of a graft copolymer (A) obtained by graft-polymerizing in a single or more stages a monomer or a monomer mixture consisting of 95 to 100% by weight of at least one monomer selected from the group of monomers consisting of alkyl acrylates, alkyl methacrylates, aromatic vinyl compounds and vinyl cyanide compounds and 0 to 5% by weight of a polyfunctional crosslinking agent on an acrylic elastomer mainly composed of an alkyl acrylate and containing 0.1 to 5% by weight of a polyfunctional crosslinking agent and/or a butadiene elastomer composed of a polybutadiene or a copolymer of 50% by weight or more of a butadiene and 50% by weight or less of other vinyl compound copolymerizable therewith and containing 0 to 5% by weight of a polyfunctional crosslinking agent, and 0.1 to 20 parts by weight of a copolymer (B) obtained by copolymerizing 3 to 30% by weight of an unsaturated acid monomer and 97 to 70% by weight of a vinyl monomer copolymerizable therewith.

As the alkyl acrylate used as a component of the acrylic elastomer which is a constituent of the graft copolymer (A) in this invention, there can be used those alkyl acrylates which have 2 to 10 carbon atoms in the alkyl group, such as ethyl acrylate, propyl acrylate, n-butyl acrylate, isobutyl acrylate, hexyl acrylate, n-octyl acrylate and 2-ethylhexyl acrylate. The acrylic elastomer may be additively copolymerized with another copolymerizable vinyl compound on condition that such compound won't affect the elasticity of the elastomer. The copolymerizable vinyl compounds that can be used include vinyl cyanide compounds, aromatic vinyl compounds, butadiene and alkyl methacrylates.

The acrylic elastomer should contain a polyfunctional crosslinking agent that facilitates the graft crosslinkage. The amount of such crosslinking agent is 0.1 to 5% by weight based on the acrylic elastomer. If its amount is less than 0.1% by weight, it becomes difficult to provide sufficient graft crosslinkage, and if the amount of said crosslinking agent exceeds 5% by weight, the elastic property of the elastomer tends to be impaired. The polyfunctional crosslinking agents usable in this invention include divinylbenzene, esters of acrylic or methacrylic acids and polyhydric alcohols such as diacrylic or dimethacrylic esters, and other known crosslinking agents having allyl groups such as triallyl cyanurate, trially isocyanurate, allyl acrylate, allyl methacrylate, diallyl itaconate and diallyl phthalate. Crosslinking agents having allyl groups are preferred in view of facilitation of graft crosslinkage.

The butadiene elastomer forming a constituent of the graft copolymer (A) in this invention is a polybutadiene or a copolymer of 50% by weight or more of butadiene and 50% by weight or less of other vinyl compound copolymerizable therewith and contains 0 to 5% by weight of a polyfunctional crosslinking agent.

As the copolymerizable vinyl compounds, there can be used, for example, vinyl cyanide compounds, aromatic vinyl compounds, alkyl acrylates and alkyl methacrylates. As the polyfunctional crosslinking agent, it is possible to use the same type of crosslinking agent as employed for the preparation of acrylic elastomer.

The acrylic elastomer and/or butadiene elastomer can be produced according to a conventional emulsion polymerization method by using a known emulsifier and polymeization initiator.

As the emulsifier, one can use anionic surface active agents such as fatty acid salts, alkylsulfates, alkylbenzene sulfonates, alkylphosphates, dialkylsulfosuccinates, etc., nonionic surface active agents such as polyoxyethylene alkyl ethers, polyoxyethylene fatty acid esters, sorbitan fatty acid esters, glycerin fatty acid esters, etc., and cationic surface active agents such as alkylamine salts. These surface active agents can be used either alone or in admixture.

The polymerization initiator can be an ordinary inorganic initiator such as a persulfate, or an organic peroxide, an azo compound or the like. These compounds may be used alone or in combination with a sulfite, hydrogensulfite, thiosulfate, primary metal salt, sodium formaldehyde sulfoxylate or the like to form a redox type initiator. The preferred persulfates for use as initiator are sodium persulfate, potassium persulfate, ammonium persulfate and the like. The organic peroxides usable as initiator include t-butyl hydroperoxide, cumene hydroperoxide, benzoyl peroxide, lauroyl peroxide and the like.

A chain transfer agent such as alkylmercaptan having 5 to 20 carbon atoms may be used for adjusting the molecular weight of the polymer.

The emulsion polymerization can be conducted at any temperature above the decomposition temperature of the initiator used, under ordinarily employed emulsion polymerization conditions. The polymerization may be carried out by adding the whole amount of the monomer or monomer mixture at one time or by continuously supplying the whole amount or a part of the monomer (mixture). In view of stability of the polymerization and dissipation of the heat of polymerization, it is preferred to carry out the polymerization by continuously supplying the whole amount or a part of the monomer or monomer mixture.

The graft copolymer (A) in this invention is preferably prepared by graft-polymerizing 25 to 125 parts by weight of a monomer or monomer mixture in the presence of 100 parts by weight of said acrylic elastomer and/or butadiene elastomer by emulsion polymerization. It should be noted that if the amount of the monomer or monomer mixture to be graft-polymerized is less than 25 parts by weight, the treatment in the coagulating and drying steps of the graft copolymer will become difficult and further the resin composition obtained after blending with PVC will prove to be extremely poor in moldability and workability and also tends to be lowered in impact strength. On the other hand, if the amount of the monomer or monomer mixture exceeds 125 parts by weight, the impact resistance improving effect after blending with PVC proves unsatisfactory.

As the monomer to be grafted, there is used at least one monomer selected from the group consisting of alkyl acrylates, alkyl methacrylates, aromatic vinyl compounds and vinyl cyanide compounds. These monomers can be used alone or in admixture either in a single or two or more stages.

The alkyl acrylates are preferably those having 2 to 10 carbon atoms in the alkyl group, such as ethyl acrylate, propyl acrylate, n-butyl acrylate, isobutyl acrylate, hexyl acrylate, octyl acrylate and 2-ethylhexyl acrylate.

As for the alkyl methacrylates, it is preferred to use those having 1 to 4 carbon atoms in the alkyl group, such as methyl methacrylate, ethyl methacrylate, propyl methacrylate, isopropyl methacrylate, n-butyl methacrylate, isobutyl methacrylate and t-butyl methacrylate. Methyl methacrylate is most preferred in view of compatibility with PVC.

Styrene is preferred as the aromatic vinyl compounds, but it is also possible to use α-substituted styrene, nuclear-substituted styrene and its derivatives such as α-methylstyrene, chlorostyrene and vinyltoluene.

The vinyl cyanide compounds are, for instance, acrylonitrile, methacrylonitrile and the like.

The graft polymerization can be carried out in succession to the preparation of acrylic elastomer and/or butadiene elastomer or separately in a different reactor under customary emulsion polymerization conditions with or without the addition of an initiator, a polymerization degree regulator, a polyfunctional crosslinking agent and/or other necessary additives. The initiator, chain transfer agent and polyfunctional crosslinking agent may be same as those used in the preparation of acrylic elastomer and/or butadiene elastomer. This graft polymerization is accomplished by graft-polymerizing 95 to 100% by weight of at least one monomer selected from the above-mentioned group of graft monomers and 0 to 5% by weight of a polyfunctional crosslinking agent in a single or more stages. If the polyfunctional crosslinking agent is used in excess of 5% by weight, the compatibitiy of the grafted portion with PVC is worsened, resulting in a poor impact resistance improving effect. The graft polymerization is allowed to proceed by adding the whole amount of the monomer(s) at one time in each stage or by continuously adding the whole amount or a part of the monomer or monomer mixture.

The copolymer (B) in this invention is obtained by copolymerizing 3 to 30% by weight of an unsaturated acid monomer and 97 to 70% by weight of a vinyl monomer copolymerizable therewith. Emulsion polymerization is preferably used for performing this copolymerization.

As the unsaturated acid monomer, there can be used the monomers containing acid groups such as acrylic acid, methacrylic acid, crotonic acid, itaconic acid, cinnamic acid, maleic anhydride, butenetricarboxylic acid and the like. If the amount of the unsaturated acid monomer in the copolymer (B) is less than 3% by weight, a satisfactory degree of impact resistance improving effect will not be provided to the impact modifier obtained after blending with the graft copolymer (A). On the other hand, if the amount of said unsaturated acid monomer exceeds 30% by weight, the latex obtained from emulsion polymerization will become unstable. Also, when blended with the latex of said graft copolymer (A), the product will prove poor in latex stability and workability.

Examples of the vinyl monomers copolymerizable with said unsaturated acid monomers usable in this invention are alkyl acrylates, alkyl methacrylates, aromatic vinyl compounds and vinyl cyanide compounds, which may be used either singly or in admixture.

In the preparation of said copolymer (B) by emulsion polymerization, the same types of emulsifier, polymerization initiator, chain transfer agent and other additives as used for the production of the graft polymer (A) can be applied, and also the copolymerization can be accomplished by the same method as used for the production of said graft copolymer (A).

The impact modifier of this invention is a blend of the graft copolymer (A) and the copolymer (B) obtained in the manner described above, the blending ratio being such that the copolymer (B) would be 0.1 to 20 parts by weight to 100 parts by weight of the graft copolymer (A). If the amount of the copolymer (B) blended is less than 0.1 part by weight, no satisfactory impact resistance improving effect is provided, while if its amount exceeds 20 parts by weight, the copolymer mixture formed by blending said both copolymers in the form of latex can not be obtained in a desired form of powder.

In accordance with this invention, said graft copolymer (A) and copolymer (B) are thus blended in the form of latex in said ratio calculated on solid base, and the resulting blended latex is usually coagulated by salt or acid, filtered and washed with water for recovering in the form of a powder, or the blended latex may be spray-dried or freeze-dried to be recovered as a powder. The product may be recovered by using the method of Japanese Patent Kokai (Laid-Open) No. 187322/82.

The impact modifier of this invention can be blended in various types of thermoplastic resins to afford high impact resistance and good workability to such thermoplastic resins while bettering the appearance of their formed products.

It is recommended that the impact modifier of this invention be blended in a thermoplastic resin in a ratio of 3 to 50 parts by weight to 100 parts by weight of the thermoplastic resin. If the ratio of the modifier blended is less than 3 parts by weight, no satisfactory impact resistance improving effect will be provided while blending of the modifier in a ratio greater than 50 parts by weight may impair the mechanical properties inherent in the thermoplastic resin. Suitable thermoplastic resins for blending with the impact modifier of this invention include PVC, polycarbonate resins, polyester resisn, acrylonitrile-styrene resins, methyl methacrylate-styrene resins and the like. PVC includes not only polyvinyl chloride but also vinyl chloride polymers in which vinyl chloride constitutes 70% by weight or more of the whole composition. The monomers to be copolymerized with vinyl chloride include ethylene, propylene, vinyl bromide, vinylidene chloride, vinyl acetate, acrylic esters, methacrylic esters and the like.

Blending of the impact modifier of this invention with a thermoplastic resin is conducted preferably in the form of powder by using a suitable mixing machine such as ribbon blender, Henschel mixer, mixing rolls, Banbury mixer, etc., and the blend is molded or formed by using known molding means such as extruder, injection molding machine, etc. If necessary, customarily used types of stabilizer, plasticizer, lubricant, colorant and other processing aids may be properly added in the course of blending.

EXAMPLES OF THE INVENTION

The present invention will be described in further detail below by way of the examples thereof. In the following Examples and Comparative Examples, all "parts" and "%" are by weight unless otherwise noted.

EXAMPLE 1

(1) Preparation of graft copolymer (A)

In 180 parts of ion-exchanged water, which has been treated with nitrogen to replace the air and placed in a reactor, were dissolved 0.3 part of boric acid, 0.03 part of anhydrous sodium carbonate, 1.5 part of potassium oleate and 0.15 part of potassium persulfate. The resulting solution was maintained at 70° C., and a mixture consisting of 99.5 parts of n-butyl acrylate and 0.5 part of allyl methacrylate was added dropwise to said solution under stirring over a period of 4 hours. Thereafter, the mixed solution was maintained at the same temperature for 2 hours to complete the polymerization. The rate of polymarization was 99.2% and the pH of the system was 7.2.

100 parts (in terms of solids) of the resultantly obtained acrylic elastomer latex, 100 parts of ion-exchanged water, 0.2 part of sodium formaldehyde sulfoxylate and 0.3 part of potassium oleate were fed into a reactor, and to this reaction mixture maintained at 70° C. while stirred was added dropwise over a period of 2 hours a mixture consisting of 50 parts of methyl methacrylate, 10 parts of styrene, 5 parts of acrylonitrile, 0.25 part of allyl methacrylate and 0.2 part of cumene hydroperoxide. After the end of said dropwise addition, the reaction mixture was maintained at the same temperature for 2 hours to complete the polymerization, thereby obtaining a graft copolymer (A) latex. The rate of polymerization in this graft copolymerization operation was over 99% for each monomer, and the average particle size of the obtained graft copolymer was $0.23\mu$.

(2) Preparation of copolymer (B)

In 200 parts of nitrogen-treated ion-exchanged water placed in a reactor were dissolved 3 parts of half-hardened tallow fatty acid soap and 0.6 part of potassium persulfate. To this solution maintained at 70° C. was added dropwise over a period of 4 hours a mixture consisting of 45 parts of ethyl acrylate, 45 parts of methyl methacrylate and 10 parts of methacrylic acid. The reaction mixture was left as it was for 3 hours to complete the polymerization, thus obtaining a copolymer (B) latex. The rate of polymerization was over 99.9%.

(3) Latex blend and polymer recovery 100 parts (in terms of solids) of the graft copolymer (A) latex was fed into a reactor provided with a stirrer, and 2 parts (in terms of solids) of the copolymer (B) latex was added thereto under stirring for 10 seconds, followed by 5-minute stirring.

The resulting latex mixture was added to an aqueous solution of sulfuric acid, coagulated by acid, washed, dehydrated and then dried to recover the polymer in the form of powder (Example 1-1).

The polymers obtained similarly by changing the ratio of the copolymer (B) are also shown in Table 1.

(4) Preparation of vinyl chloride resin composition

In a Henschel mixer, 1.0 part of tribasic lead sulfate, 0.3 part of dibasic stearic acid, 2.4 parts of lead stearate, 0.3 part of stearic acid, 0.3 part of polyethylene wax and 13 parts of modifier obtained in (3) above were mixed with 100 parts of a vinyl chloride resin with an average polymerization degree of 1,100 and heated to 115° C. to obtain a homogeneous mixture. Each of the thus prepared vinyl chloride resin compositions was molded into a square bar by a 30 mm single-screw extruder under the following conditions:

| Temperature | Cylinder 1 150° C. | Cylinder 2 165° C. | Cylynder 3 180° C. | Die 200° C. |
|---|---|---|---|---|
| Screw | CR = 3.0, 30 mm φ full-flighted screw | | | |

The impact strength of the moldings was measured according to ASTM D-256 except for use of the test piece U-notched to a depth of 2 mm. The impact strength evaluation method is common to all of the Examples and Comparative Examples given below.

The results of the measurements are shown in Table 1.

TABLE 1

| | Graft copolymer (A) (parts) | Copolymer (B) (parts) | Izod impact strength (kg · cm/cm$^2$) | Remarks |
|---|---|---|---|---|
| Comparative Example 1 | 100 | 0.05 | 11.2 | Good powder condition |
| Example 1-1 | " | 2 | 37.6 | Good powder condition |
| Example 1-2 | " | 4 | 46.1 | Good powder condition |
| Example 1-3 | " | 15 | 46.6 | Good powder condition |
| Comparative Example 2 | " | 30 | — | Coagulum was formed |

It can be seen from the above-shown results that the impact resistance improving effect is raised when the copolymer (B) is blended in certain specified amounts.

EXAMPLE-2

(1) Preparation of graft copolymer (A)

Preparation of butadiene elastomer:

| 1,3-butadiene | 75 parts |
|---|---|
| Styrene | 25 parts |
| Divinylbenzene | 0.5 parts |
| Diisopropylbenzene hydroperoxide | 0.2 parts |
| Sodium pyrophosphate | 0.5 parts |
| Ferous sulfate | 0.01 parts |
| Dextrose | 1.0 parts |
| Potassium oleate | 0.5 parts |
| Water | 200 parts |

Above materials of shown amounts were polymerized in a pressure autoclave at 50° C. The polymerization was completed in 20 hours, and the obtained rubber had an average particle size of 0.17µ.

100 parts (in terms of solids) of the thus obtained butadiene elastomer latex was charged into a reactor, followed by the addition of 0.5 part of sodium formaldehyde sulfoxylate. To this mixture maintained at 70° C. was added dropwise over a period of one hour a mixed solution consisting of 8 parts of ethyl acrylate and 32 parts of methyl methacrylate added with 0.16 part of cumene hydroperoxide (hereinafter referred to as CHP), the mixture being allowed to stand as it was for additional one hour. Then, as the second stage, a mixture made by adding 0.2 part of CHP to 50 parts of styrene was added dropwise continuously for one hour, followed by 2-hour standing of the mixture. As the third stage, a mixed solution consisting of 8 parts of methyl methacrylate, 2 parts of ethyl acrylate and 0.04 part of CHP was added dropwise over a period of 15 minutes, followed by one-hour standing of the mixture to complete the polymerization. There was resultantly obtained a graft copolymer (A) latex.

To 100 parts (as solids) of this graft copolymer latex was blended 2 parts (as solids) of the copolymer (B) latex obtained in Example 1-(2), the blend being treated in the same way as in Example 1-(3) and (4) to obtain a vinyl chloride resin composition, and the impact resistance of this composition was evaluated by the same method as used in Example 1, the results being shown in Table 2. The results obtained with the similar compositions with different contents of the copolymer (B) are also shown in Table 2.

TABLE 2

| | Graft copolymer (A) (parts) | Copolymer (B) (parts) | Izod impact strength (kg · cm/cm$^2$) | Remarks |
|---|---|---|---|---|
| Comparative Example 3 | 100 | 0.05 | 12.8 | Good powder condition |
| Example 2-1 | " | 2 | 54.5 | Good powder condition |
| Example 2-2 | " | 4 | 50.8 | Good powder condition |
| Example 2-3 | " | 15 | 56.1 | Good powder condition |
| Comparative Example 4 | " | 30 | — | Coagulum was formed |

The above results show that blending of the copolymer (B) in specified amounts elevates the impact resistance improving effect.

EXAMPLE 3

An elastomer latex was obtained by flllowing the same process as in Example 2-1 except that 30 parts of 1,3-butadiene and 70 parts of n-butyl acrylate were used as monomers.

The obtained elastomer latex was supplied into a reactor and treated as in Example 2-1 to obtain a graft copolymer (A) latex.

To 100 parts (as solids) of this graft copolymer latex was blended 2 parts (as solids) of the copolymer (B) latex obtained in Example 1-(2) and the blend was treated as in Example 1-(3) and (4) to obtain a vinyl chloride resin composition. Impact resistance of this composition was evaluated by the method of Example 1, the results being shown in Table 3. Also shown in Table 3 are the results obtained when the amount of the copolymer (B) was changed.

TABLE 3

| | Graft copolymer (A) (parts) | Copolymer (B) (parts) | Izod impact strength (kg · cm/cm$^2$) | Remarks |
|---|---|---|---|---|
| Comparative Example 5 | 100 | 0.05 | 18.1 | Good powder condition |
| Example 3-1 | " | 2 | 62.6 | Good powder |

TABLE 3-continued

| Graft copolymer (A) (parts) | Copolymer (B) (parts) | Izod impact strength (kg·cm/cm²) | Remarks |
|---|---|---|---|
| Example 3-2 | " | 4 | 65.8 | Good powder condition |
| Example 3-3 | " | 15 | 58.2 | Good powder condition |
| Comparative Example 6 | " | 30 | — | Coagulum was formed |

From the above results, it is noted that the impact resistance improving effect is raised by blending the copolymer (B) in specified amounts.

EXAMPLE 4

A copolymer (B) latex was obtained by polymerizing a mixture consisting of 50 parts of n-butyl acrylate, 35 parts of methyl methacrylate and 15 parts of acrylic acid by the method shown in Example 1-(2).

3 parts (as solids) of this copolymer (B) latex was blended with 100 parts (as solids) of the graft copolymer (A) latex obtained in Example 1-(1) and the blend was treated according to the processes shown in Example 1-(3) and (4) to obtain a vinyl chloride resin composition. Impact resistance of this composition was evaluated by the same method as used in Example 1, the results being shown in Table 4. The results of evaluation on the compositions obtained similarly but by changing the composition and amount of the copolymer (B) are also shown in Table 4.

TABLE 4

| | Graft copolymer (A) (parts) | Copolymer (B) Monomer composition (%) | Amount added (parts) | Izod impact strength (kg·cm/cm²) | Remarks |
|---|---|---|---|---|---|
| Example 4-1 | 100 | BA/MMA/AA = 50/35/15 | 3 | 50.5 | Good latex stability |
| Example 4-2 | " | EA/MMA/AA = 50/40/10 | 4 | 41.2 | Good latex stability |
| Example 4-3 | " | MA/MMA/MAA = 60/30/10 | 1.5 | 35.9 | Good latex stability |
| Example 4-4 | " | BA/IA = 85/15 | 2 | 40.9 | Good latex stability |
| Example 4-5 | " | MMA/St/CA = 60/30/10 | 5 | 43.7 | Good latex stability |
| Comp. Example 7 | " | BA/MMA/AA = 60/38/2 | 4 | 12.8 | Good latex stability |
| Comp. Example 8 | " | BA/AA = 60/40 | 2 | — | Blend latex coagulated |

The abbreviations used in Table 4 and the succeeding tables are as follows:
BA: n-butyl acrylate
MMA: methyl methacrylate
AA: acrylic acid
EA: ethyl acrylate
MA: methyl acrylate
MAA: methacrylic acid
IA: itaconic acid
St: styrene
CA: crotonic acid It can be learned from the above results that a small unsaturated acid content in the copolymer (B) latex results in a small impact resistance improving effect while a large unsaturated acid content impairs the stability of the latex after blending.

EXAMPLE 5

A copolymer (B) latex was obtained by polymerizing a mixture consisting of 50 parts of n-butyl acrylate, 35 parts of methyl methacrylate and 15 parts of acrylic acid according to the method of Example 1-(2).

3 parts (as solids) of this copolymer (B) latex was blended with 100 parts (as solids) of the graft copolymer (A) latex obtained in Example 2-(1), the blend being treated according to Example 1-(3) and (4) to obtain a vinyl chloride resin composition, and impact resistance thereof was evaluated by the method used in Example 1, the results being shown in Table 5. The evaluation results obtained with the resin compositions prepared similarly but by changing the composition and amount of the copolymer (B) are also shown in Table 5.

TABLE 5

| | Graft copolymer (A) (parts) | Copolymer (B) Monomer composition (%) | Amount added (parts) | Izod impact strength (kg·cm/cm²) | Remarks |
|---|---|---|---|---|---|
| Example 5-1 | 100 | BA/MMA/AA = 50/35/15 | 3 | 56.2 | Good latex stability |
| Example 5-2 | " | EA/MMA/AA = 50/40/10 | 4 | 60.3 | Good latex stability |
| Example 5-3 | " | MA/MMA/MAA = 60/30/10 | 1.5 | 48.7 | Good latex stability |
| Example 5-4 | " | BA/IA = 85/15 | 2 | 51.0 | Good latex stability |
| Example 5-5 | " | MMA/St/CA = 60/30/10 | 5 | 58.3 | Good latex stability |
| Comp. Example 9 | " | BA/MMA/AA = 60/38/2 | 4 | 14.4 | Good latex stability |
| Comp. | " | BA/AA = 60/40 | 2 | — | Blend latex |

TABLE 5-continued

| | Graft copolymer (A) (parts) | Copolymer (B) Monomer composition (%) | Amount added (parts) | Izod impact strength (kg·cm/cm²) | Remarks |
|---|---|---|---|---|---|
| Example 10 | | | | | coagulated |

The above results show that a small unsaturated acid content in the copolymer (B) gives a small impact resistance improving effect while a large unsaturated acid content impairs the stability of the latex after blending.

EXAMPLE 6

An acrylic elastomer was obtained in the same manner as in Example 1-(1) except that n-octyl acrylate was used as alkyl acrylate and 0.5 part of triallyl isocyanurate was used as polyfunctional crosslinking agent. To 100 parts (as solids) of this acrylic elastomer was blended a mixture consisting of 59.6 parts of methyl methacrylate and 0.4 part of triallyl isocyanurate and the blend was treated after the manner of Example 1-(1) to obtain a graft copolymer (A) latex.

To 100 parts (as solids) of this graft copolymer (A) was blended 3 parts (as solids) of the copolymer (B) latex obtained in Example 1-(2), the blend being treated as in Example 1-(3) to recover the polymer and the latter was further treated as in Example 1-(4) to obtain a vinyl chloride resin composition. Impact resistance of this vinyl chloride resin composition was evaluated according to the method used in Example 1, obtaining the results shown in Table 6. The evaluation results obtained from the resin compositions obtained similarly by changing the amount of polyfunctional crosslinking agent in the acrylic elastomer and in the graft layer are also shown in Table 6.

polyfunctional crosslinking agent in the acrylic elastomer is too large or too small.

EXAMPLE 7

An acrylic elastomer latex was obtained in the same manner as in Example 1-(1) except that 2-ethylhexyl acrylate was used instead of n-butyl acrylate as alkyl acrylate. To 100 parts (as solids) of this acrylic elastomer was blended a monomer mixture for graft polymerization by varying the amount thereof in five ways as shown in Table 7 to obtain five different specimens of graft copolymer (A). As supplemental emulsifier, potassium oleate was used in an amount of 0.75% based on the monomer mixture. Also, as polymerization initiator, sodium formaldehyde sulfoxylate and tertiary-butyl hydroperoxide were used in amounts of 0.3% and 0.35%, respectively, based on the monomer mixture. The ratios of the respective monomers in the graft polymerized monomer mixture were as follows: methyl methacrylate 75%, styrene 15% and acrylonitrile 10%.

To 100 parts (as solids) of each of the thus obtained graft copolymer (A) latices was blended 2 parts (as solids) of the copolymer (B) latex obtained in Example 1-(2) and the blend was treated as in Example 1-(3) to obtain a polymer, this polymer being further treated according to Example 1-(4) to obtain a vinyl chloride resin composition.

Impact resistance of each of the thus obtained vinyl

TABLE 6

| | Graft copolymer (A) latex 100 parts (as solids) | | | | Copolymer (B) latex (parts) | Izod impact strength (kg·cm/cm²) |
|---|---|---|---|---|---|---|
| | Acrylic elastomer | | Graft layer | | | |
| | Monomer (parts) | Polyfunctional crosslinking agent (parts) | Monomer (parts) | Polyfunctional crosslinking agent (parts) | | |
| Comp. Example 11 | OA 99.97 | TAIC 0.03 | MMA 59.99 | TAIC 0.01 | 3 | 17.9 |
| Example 6-1 | OA 99.5 | TAIC 0.5 | MMA 59.6 | TAIC 0.4 | " | 44.8 |
| Example 6-2 | OA 99 | TAIC 1 | MMA 59.5 | TAIC 0.5 | " | 39.0 |
| Example 6-3 | OA 98 | TAIC 2 | MMA 59 | TAIC 1.0 | " | 32.3 |
| Comp. Example 12 | OA 94 | TAIC 6 | MMA 57 | TAIC 3 | " | 9.5 |

The abbreviations used in Table 6 are as follows:
OA: n-octyl acrylate
TAIC: triallyl isocyanurate The above results indicate that the impact resistance improving effect is reduced when the amount of the chloride resin compositions was evaluated in the manner described in Example 1-(4) to obtain the results shown in Table 7.

TABLE 7

| | Graft copolymer (A) | | | | |
|---|---|---|---|---|---|
| | Acrylic elastomer (parts) | Amount of monomer mixture for graft polymerization (parts) | Graft copolymer (A) (parts) | Copolymer (B) (parts) | Izod impact strength (kg·cm/cm²) |
| Comparative Example 13 | 100 | 15 | 100 | 2 | 22.7 |
| Example 7-1 | " | 40 | " | " | 45.7 |
| Example 7-2 | " | 75 | " | " | 41.0 |

TABLE 7-continued

| | Graft copolymer (A) | | | | |
|---|---|---|---|---|---|
| | Acrylic elastomer (parts) | Amount of monomer mixture for graft polymerization (parts) | Graft copolymer (A) (parts) | Copolymer (B) (parts) | Izod impact strength (kg · cm/cm$^2$) |
| Example 7-3 | " | 100 | " | " | 35.6 |
| Comparative Example 14 | " | 150 | " | " | 19.5 |

EXAMPLE 8

30 parts of the modifier obtained in Example 1-(1)-(3), 70 parts of a polycarbonate resin, 0.2 part of an antioxidant and 0.1 part of calcium stearate were mixed by a Henschel mixer and the mixture was pelletized by a 30 mm φ extruder set at a cylinder temperature of 240° C. After drying, test pieces were made by an injection molding machine and their impact strength was measured. The results are shown in Table 8. Also shown in Table 8 are the results obtained when the amount of the copolymer (B) added was changed.

TABLE 8

| | Graft copolymer (A) (parts) | Copolymer (B) (parts) | Izod impact strength (kg · cm/cm$^2$) |
|---|---|---|---|
| Comparative Example 15 | 100 | 0.05 | 16.7 |
| Example 8-1 | " | 2 | 41.5 |
| Example 8-2 | " | 4 | 44.0 |
| Example 8-3 | " | 15 | 50.8 |

As seen from the above results, the modifier according to this invention exhibits a good impact resistance improving effect for polycarbonate resins.

EXAMPLE 9

A methyl methacrylate-butadiene-styrene resin (MBS resin), a chlorinated polyethylene (ClPE), both of which are commercially available PVC modifiers, and the modifier obtained in Example 1-(1)-(3) were treated in the same way as in Example 1-(4) to obtain vinyl chloride resin compositions and their weather resistance was measured. The results are shown in Table 9. Weather resistance was shown by way of izod impact strength and degree of coloration after an accelerated exposure treatment by a weathermeter.

TABLE 9

| | | Weather resistance | | | | |
|---|---|---|---|---|---|---|
| | | Izod impact strength (kg · cm/cm$^2$) | | | | |
| | Modifier | Before exposure | After 100-hour accelerated exposure | After 300-hour accelerated exposure | After 600-hour accelerated exposure | Degree of coloration after 600-hour accelerated exposure |
| Example 9 | Modifier obtained in Example 1-(1)-(3) | 37.6 | 33.9 | 31.7 | 29.4 | o |
| Comp. Example 16 | MBS | 23.5 | 12.2 | 8.5 | 7.9 | x |
| Comp. Example 17 | ClPE | 21.2 | 17.5 | 14.3 | 10.9 | Δ |

Rating of the degree of coloration in Table 9 is as follows:
o: Substantially not colored. (Good)
Δ: Somewhat colored. (Undesirable)
x: Colored. (Bad)

As seen from the results of Table 9, the modifier according to this invention has very excellent weather resistance (initial impact retention and color development) in comparison with commercial MBS resin and ClPE.

What is claimed is:

1. An impact modifier comprising a blend of 100 parts by weight of a graft copolymer (A) obtained by graft-polymerizing a monomer or a monomer mixture consisting of 95 to 100% by weight of at least one monomer selected from the group consisting of alkyl acrylates, alkyl methacrylates, aromatic vinyl compounds and vinyl cyanide compounds and 0 to 5% by weight of a polyfunctional crosslinking agent on an acrylic elastomer mainly composed of an alkyl acrylate and containing 0.1 to 5% by weight of polyfunctional crosslinking agent, a butadiene elastomer composed of a polybutadiene or a copolymer of 50% by weight or more of a butadiene and 50% by weight or less of other vinyl compound copolymerizable therewith and containing 0 to 5% by weight of a polyfunctional crosslinking agent, or mixtures thereof, and 0.1 to 20 parts by weight of a copolymer (B) obtained by copolymerizing 3 to 30% by weight of an unsaturated acid monomer and 97 to 70% by weight of vinyl monomer copolymerizable therewith selected from the group consisting of alkyl acrylates, alkyl methacrylate, aromatic vinyl compounds, vinyl cyanide compounds and mixtures thereof.

2. An impact modifier according to claim 1, wherein graft copolymer (A) is obtained by graft-polymerizing 25 to 125 parts by weight of the monomer or the monomer mixture on 100 parts by weight of the acrylic elastomer in one or more stages.

3. An impact modifier according to claim 2, wherein the elastomer in the graft copolymer (A) is the acrylic elastomer composed of 50 to 100% by weight of an alkyl acrylate and 0 to 50% by weight of another vinyl compound copolymerizable therewith and containing 0.1 to 5% by weight of the polyfunctional crosslinking agent having a plurality of addition polymerizable groups.

4. An impact modifier according to claim 2, wherein the elastomer in the graft copolymer (A) is the butadiene elastomer composed of a polybutadiene or a copolymer of 50 to 100% by weight of a butadiene and 0 to 50% by weight of another vinyl compound copolymerizable therewith and containing 0 to 5% by weight of the polyfunctional crosslinking agent having a plurality of addition polymerizable unsaturated groups.

* * * * *